United States Patent Office 3,092,836
Patented June 4, 1963

3,092,836
PHTHALOCYANINE COLORING OF STONE AND AQUATIC ANIMAL SHELLS, THE MATERIALS SO COLORED AND STRUCTURES MADE THEREFROM
James D. Boggus, Jasper, Ga., assignor to Marble Products Company of Georgia, a corporation of Georgia
No Drawing. Filed Sept. 2, 1960, Ser. No. 53,620
17 Claims. (Cl. 8—8)

This invention broadly relates to the coloring of porous inorganic materials and, in some of its more specific aspects, the invention is concerned with the coloring of naturally occurring stone and aquatic animal shells in particulate, slab or block form by means of phthalocyanine dyestuffs or pigments and the artificially colored product thus produced.

Naturally occurring, vividly colored stone suitable for decorative purposes and which also possesses sufficiently high strength for use as a building material is in great demand. However, such stone is not readily available in most localities and the cost is prohibitively high in most instances for other than limited uses where the added expense is not an important factor. Additionally, the limited number of colors and hues of commercially available stone imposes somewhat of a restriction on the decorative possibilities. As a result, there has been much unsuccessful experimentation prior to the present invention in an effort to prepare an economical artificially colored stone having desirable properties similar to those of naturally occurring colored stone such as a vivid, intense color extending into the interior of the stone, high strength characteristic of the natural stone before coloring and, preferably, good resistance to fading upon exposure to ultraviolet light, oxidizing agents such as oxygen, moisture, and other elements of weathering.

In general, with the exception of materials such as glassy quartz which do not have a microcrystalline structure, commonly occurring stones are characterized by the presence of numerous interconnecting microscopic intercrystalline spaces or voids referred to in the specification and claims as pores which result in a surprisingly porous structure. The pores are permeable to air and water and these substances are present to varying extents.

The processes for coloring naturally occurring stone described in the prior art involve a pretreatment for the purpose of removing the water or moisture content of the stone prior to the coloring step, such as by heating to a high temperature or evacuating to a low pressure in a vacuum chamber. Since the water is held tenaciously, the pretreatment necessarily involves vigorous conditions of treatment. The colored stone then is contacted with a solution of dye or coloring agent in a solvent to produce the artificially colored stone. In every instance, the resultant product was unsatisfactory due in part to the low levels of color intensity obtainable and the deterioration of the stone in the pretreatment step such as by weakening its crystalline structure and lowering the mechanical properties. Additionally, the prior art processes did not result in satisfactory penetration and retention of the coloring agent and the pretreatment was of such a nature as to be uneconomical and to require a large amount of heat or expensive special equipment. In view of the above, the art has long sought an entirely satisfactory process for the coloring of naturally occurring stone so as to resemble the usually more expensive, less readily available naturally colored stone.

The present invention may be described and illustrated hereinafter with specific reference to the coloring of dolomitic limestone, whitestone, dolomite, calcitic limestone, marble, granite, or aquatic animal shells in the form of chips such as are satisfactory in the manufacture of terrazzo and composition blocks or for use as roofing granules. Colored chips for the manufacture of terrazzo or composition blocks must possess a combination of properties in order to meet all aesthetic and mechanical strength requirements. For example, when the chips are used in terrazzo floors, it is essential that the product to be hard and possess great mechanical strength. Additionally, it is desirable that the chips be intensely colored so that they may be used alone or admixed with a contrasting color or colors to provide a pleasing effect in place as roofing granules or when set in terrazzo topping. Also, the colored chips should be resistant to fading and capable of being placed in the terrazzo topping without discoloring the matrix by bleeding. The artificially colored stone available prior to my invention has not possessed all of the foregoing characteristics and the industry has been forced to resort to the usually more expensive naturally colored chips which may cost several times as much as the more plentiful white marble, dolomite, dolomitic limestone, granite, aquatic animal shells or other naturally occurring porous stones.

In accordance with the present invention, porous inorganic material may be colored to resemble naturally colored stone using phthalocyanine dyestuffs and/or pigments. When the stone is in the form of chips of a suitable size it may be intensely colored to produce chips that are entirely satisfactory for the manufacture of terrazzo, marble chip roofs, and for other purposes. The resultant chips will not bleed into the matrix in the manufacture of terrazzo by conventional practices even in the absence of a treatment for the fixation of the colorant. Also, the original strength and mechanical properties of the stone are not adversely affected and it is as satisfactory in all respects as the natural untreated stone.

It is an object of the present invention to provide a novel process for coloring porous inorganic materials which does not require a pretreatment step for the removal of water.

It is still a further object of the present invention to provide a novel process for coloring porous naturally occurring stone and aquatic animal shells in block, slab or particulate form by means of a phthalocyanine dyestuff or pigment in a suitable liquid media whereby the slabs, blocks, or particles of stone or shells may be colored in their natural state without the necessity for a heating step or a subsequent step for fixing the dyestuff.

It is still a further object of the present invention to provide novel, artificially colored stone chips useful in the construction of stone chip roofs, terrazzo, and the like which retain the desirable qualities of the untreated chips and which are colorfast and will retain their color upon exposure to light over long periods of time.

It is still a further object of the present invention to provide terrazzo containing the novel artificially colored product prepared in accordance with the present invention.

It is still a further object of the present invention to provide a stone chip roof containing the novel artificially colored product prepared in accordance with the present invention.

Still other objects and the attendant advantages of the present invention will be apparent to those skilled in the art upon reference to the following detailed description and the examples.

In accordance with one variant of the present invention, a porous body of inorganic material is colored by contacting the same with a suitable liquid media containing a phthalocyanine colorant such as phthalocyanine dyestuffs or pigments. If desired, the resultant colored porous body may be subjected to further treatment as will be described hereinafter for the removal of solvent or liquid dispersant and its contained colorant content and the removal of excess coloring from the exterior surface of the stone.

Phthalocyanine pigments and dyestuffs are well-known to the art and are described in numerous publications and issued patents, such as on pages 941—942 of the text "Organic Chemistry" by Louis F. and Mary Fieser, published by D. C. Heath & Company, Boston, Mass. (2nd edition). As is well-known, phthalocyanines are derivable from an o-dicyano benzene compound, though not necessarily, and usually involve a complex molecular structure in which a plurality of aromatic or benzene ring structures are linked together, e.g., with alternate nitrogen and carbon atoms forming a linkage between ring carbon atoms of adjacent aromatic ring structures. The resultant phthalocyanine nucleus may or may not have a metal present, but when a metal is present usually it is a divalent metal having a coordination number of 4–6 such as copper, iron, zinc, nickel, cobalt, and tin. In instances where one of the foregoing metals is not present, then two atoms of hydrogen usually are present.

Unsubstituted phthalocyanines are often insoluble in water as well as organic solvents, and thus it is usually desirable to use substituted phthalocyanines when dyeing from a solution or bath. However, in some instances suspensions of finely divided phthalocyanine pigments may be used if desired. The substituents which may be substituted on the phthalocyanine nucleus in the case of a dyestuff may vary widely, depending upon the nature of the desired solvent and whether the resultant dyestuff is desired to be of the direct, vat, or other type. For instance, the hydrophilic property of phthalocyanines may be enhanced, and thus the water solubility increased, by substituting hydrophilic groups on the phthalocyanine nucleus such as sulphonic acid groups, sulphonamide groups, the nitrogen of which may be mono- or disubstituted by alkyl-, aryl-, or aralkyl radicals, sulphinic acid groups, carboxy acid groups, carboxylic amide groups, cyano groups, hydroxy groups, alkoxy groups, —SH groups, —S-alkyl groups, nitro groups, amino groups, or acylamino groups. These substituents may be introduced into the phthalocyanine nucleus by conventional methods, i.e. either subsequent to the phthalocyanine complex formation or in the course of preparing the phthalocyanine by starting from phthalic acids, phthalonitriles, etc. containing such substituents, e.g. 4-sulphophthalic acid, 4-methoxyphthalic acid, etc. Additionally, the solubility of certain phthalocyanine dyestuffs for use in vat dyeing may be enhanced by reacting an aldehyde such as formaldehyde, with or without an amide, with the phthalocyanine nucleus; or by introducing a phosphorous acid group such as —P(OH)$_2$. Oil soluble phthalocyanine dyestuffs are known and may be prepared by analogous methods by substituting organophilic groups on the phthalocyanine nucleus such as imidomethyl and o-carboxyamidomethyl groups. Phthalocyanine dyes modified as discussed above are well-known in the art, and are described in numerous publications and issued patents such as U.S. Patents 2,000,052, 2,253,560, 2,613,128, 2,613,129, 2,761,868, and 2,908,544, the teachings of these patents being incorporated herein by reference.

From the above discussion, it is apparent that a wide variety of phthalocyanine dyestuffs or pigments is satisfactory in practicing the present invention. Examples of commercially available water soluble phthalocyanine dyestuffs which have been found to be especially useful in the coloring of marble are Alcian Blue 8GX 300, Alcian Yellow GX, Alcian Blue 5GX, Durazol Paper Blue 10GS and Durazol Blue 8GS, but numerous other commercially available phthalocyanine dyestuffs may be used if desired. The phthalocyanine dyestuffs may be of the water soluble type, as illustrated by the above-mentioned direct and ingrain dyes, vat dyes which may be rendered water soluble by means of a reducing agent such as disclosed in U.S. Patents 2,613,128 and 2,613,129, oil soluble dyes such as disclosed in U.S. Patent 2,761,868, and solvent or mordant dyes, such as disclosed in the "Colour Index," vol. 3, page 3573. Also, in some instances phthalocyanine pigment may be used such as those disclosed in the "Colour Index," vol. 3, pages 3569–3572.

The soluble phthalocyanine dyestuffs preferred for practicing the present invention are further characterized by additional properties, as follows:

a. The colorant should be soluble in a solvent which is capable of penetrating the stone under normal ambient conditions in a reasonable period of time such as not more than 24–28 hours.

b. The colorant should be retained by the porous body to be colored without being removed by the solvent during the solvent removal step.

c. The colorant should be stable to moisture and preferably alkaline aqueous solutions.

d. The colorant should be resistant to oxidation or weathering, stable to light and especially ultra-violet light, and stable at normal temperatures encountered in the desired end use.

When soluble phthalocyanine dyestuffs are used, the dye solution may be prepared in accordance with the usual prior art practice for dyeing other substrates. For instance, a direct or ingrain water soluble dyestuff may be simply dissolved in water in the desired amount, the stone immersed in the solution and colored, the colored stone removed from the solution and excess solvent removed by evaporation or other means. In instances where vat phthalocyanine dyestuffs are used, a solution of the dyestuff in its leuko form is produced in the presence of a reducing agent such as sodium hydrosulfite, the stone immersed for the desired period of time in the resultant solution, and then removed and air or chemically oxidized to the oxidized form of the dye to produce the desired color.

In instances where an oil soluble phthalocyanine dyestuff is used, it may be first dissolved in a small amount of organic solvent and then added in the form of a concentrated solution or paste to the desired organic solvent which is to be used. Then, the stone is immersed in the resultant organic dye solution. A wide variety of organic solvents may be used, but as a general rule water insoluble non-polar solvents or substantially water insoluble non-polar solvents having a dielectric constant less than 10 are preferred in instances where an unusually intense and uniform coloration throughout the body of stone is desired. Examples of suitable organic solvents include liquid aliphatic hydrocarbons, preferably those having at least six carbon atoms, such as kerosene, heptane, and octane, liquid cyclohydrocarbons such as cyclohexane, liquid aromatic hydrocarbons such as benzene, liquid chlorinated hydrocarbons such as carbon tetrachloride, chloroethene, and chloroform, and benzene derivatives such as nitrobenzene. Mixtures of suitable organic solvents may be used, if desired. Less satisfactory organic solvents may be suitable in some instances such as ethanol, isoamylol and Cellosolve (ethylene (glycol) monoethyl ether). In the case of a solvent soluble phthalocyanine dyestuff, the solvent may be as recommended in the "Colour Index" for the particular dyestuff used.

The specific liquid media selected, whether aqueous or organic in nature, should be capable of dissolving or suspending at least one and preferably five or more grams per gallon of a desired phthalocyanine dyestuff or pigment. Where the dyestuff is intensely colored and strongly retained by the stone, then lower concentrations such as one-quarter to one gram per gallon may be satisfactory in some instances and especially when light colors are desired. The upper limit is largely economic in nature when intense colors are desired such as up to 100 grams of the dyestuff or pigment per gallon of liquid media. Where the colorant is very soluble in the solvent and very intense colors are desired, then higher concentrations may be desirable such as above 100 grams per gallon and up to the limit of solubility of the dyestuff.

Relatively large solid particles of a solvent soluble dyestuff which remain undissolved in the solvent are not generally desired since they result in an unlevel or spotty dyeing of the stone. In the case of suspensions of finely divided phthalocyanine pigments, the apparent concentration of pigment may be as noted above for the solutions. Also, aqueous or organic media as mentioned above may be used in forming the dispersion.

In practicing a preferred variant of the invention, stone of a desired size and without a pretreatment to remove water, e.g. as quarried, is contacted with a solution of phthalocyanine dyestuff or a suspension of phthalocyanine pigment over a period of time which is sufficient to result in penetration to a desired depth and in coloration to a desired intensity. This will vary somewhat with each type of stone and colorant. Usually, a period of treatment of 24 hours or less is satisfactory, with periods of treatment between 4 hours and 24 hours being preferred in most instances. The period of treatment may be shortened markedly by warming the solution of dyestuff or suspension of pigment in a liquefied media or the chips themselves, such as by warming to a temperature limited by the boiling point of the specific solvent or liquid media. For example, the period of treatment may be shortened to one-quarter to one hour by heating the stone or the liquid media to a temperature of 50–100° C. when water is used as the solvent. The heating may be accomplished by heating the chips themselves, or simply by circulating warmed liquid media containing the colorant over unheated chips. A heating step is not necessary and heating to a sufficiently high temperature to remove all naturally occurring water from the stone should be avoided in order to prevent deterioration of the stone.

The resultant colored stone is taken from the liquid media containing colorant and the residual liquid media removed. In instances where a water soluble dyestuff is used, this merely involves draining of the dye solution from the stone and rinsing the resultant stone in fresh water, followed by air or chemical oxidation in the case of a vat dyestuff. The resultant chips are then ready for use in the manufacture of terrazzo, roofing, and the like.

In instances where a water insoluble organic solvent is used, the solvent may be drained from the stone and the remaining solvent may be allowed to evaporate. However, preferably, the organic solvent together with its colorant content is recovered by flooding the stone with water whereby a layer of water-insoluble solvent and colorant separates as a second phase and is then withdrawn. This will remove substantially all of the solvent and excess colorant and any remaining traces on the exterior of the stone may be removed by washing in water containing a small amount of a commercial surface active agent with vigorous agitation. The resultant stone is suitable for terrazzo manufacture or for use as roofing granules.

Another alternative method of cleaning the colored product involves employment of ultrasonic shock waves during immersion of the stone in water. Sonic cleaning of the stone is rapid, efficient, a detergent is not required as the stone may be merely immersed in fresh water, and it results in nondegenerative removal of both solvent and excess exterior coloring.

A water washing step may follow any of the foregoing steps for removal of colorant and a final rinse in fresh water is desirable to remove any surface active agent, if used, which otherwise would tend to promote bleeding when the stone is later employed in the manufacture of terrazzo.

A treatment for setting the colorant is not essential when practicing the present invention. For example, it is not necessary to heat the colored chips to an elevated temperature in order to set the colorant and prevent its removal upon subsequent immersion in water or organic solvent.

When a water soluble dye is used with water as a solvent, often the intensity of the color may be enhanced by acidifying the dye solution initially to the litmus point or even to a lower pH value. Either mineral acids or organic acids may be used for this purpose.

Stones dyed or colored in accordance with the present invention have a very pleasing appearance and an intense, bright coloration. The dyestuff may penetrate to the center of the stone without a substantial gradation in intensity of color in instances where a preferred organic solvent and oil soluble dyestuff is used. For example, stones one-eighth inch to one-half inch and up to one inch in diameter or slabs up to one inch in thickness may be dyed with the center portion having substantially the same intensity of color as the surface portion. Often, even larger stones may be colored throughout, if desired, such as up to 8 inches in diameter, and blocks or slabs of marble or other porous stones may be colored to a substantial depth such as up to eight inches or greater. In instances where water soluble dyestuffs with water as the solvent or suspensions of pigment in aqueous or organic media are used there may be a gradual gradation in intensity of color with increasing depth. However, this is not a disadvantage in instances when the resultant product is to be used as roofing granules, facings, and the like where the interior of the stone is not exposed. Also, it has been found that the gradation in intensity of color often enhances the beauty of terrazzo when the stones are used in terrazzo manufacture. The gradation in intensity of color may be controlled somewhat by adjusting variables such as by increasing the colorant concentration and/or the time of exposure.

The artificially colored stones of the present invention also may be used in preparing decorative composition blocks having artificially colored chips as one component and a cementing agent as a second component. Such composition blocks may be manufactured by conventional methods when using the artificially colored stone of the invention. Additionally, the artificially colored chips are fast to the leaching action of water and they may be used as aquarium chips. Articles subjected to weathering such as monuments, structural elements and the like may be given a decorative hue by the process of the invention, and many other uses will be apparent to those skilled in the art in view of the above.

The foregoing detailed discussion and the following specific examples are for purposes of illustration only and are not intended to be limiting to the spirit or scope of the appended claims.

EXAMPLE I

A phthalocyanine dyestuff known as Alcian Blue 8GX 300 and classified as Ingrain Blue 1, 74240 by the "Colour Index," was dissolved in water in an amount of 50 grams per gallon. The resultant solution was acidified with sulphuric acid to the extent that blue litmus paper turned red. The solution was warmed to 50–100° C. and after the dyestuff was completely dissolved white limestone chips one-quarter inch to one-half inch in diameter were added in an amount whereby the solution covered the chips. The heating was continued while keeping the solution slightly below the boiling point for a period of time sufficient to attain the desired intensity of color.

After about thirty minutes to one hour, an intense blue color was obtained and the chips were removed from the solution and subjected to a cold water rinse to remove the remaining solution. The chips were then ready for use in the same manner as naturally occurring colored chips, such as for roofing granules or in the manufacture of terrazzo tile. For both uses, it was found that the chips retained all of the natural advantages of uncolored white limestone and in addition had the decorative advantages of colored chips.

If desired, the solution of dye may be acidified substantially past the litmus point, or other acids may be used including mineral acids such as hydrochloric and organic acids such as acetic acid, or the acid may be eliminated altogether and a substantially neutral dye solution used. In instances where a neutral or alkaline dye solution is used, it has been found that satisfactory colored chips may be obtained although the depth of color usually is not as great as that obtained from an acidified dye solution under otherwise identical conditions. Thus, the invention also provides a method of intensifying the color by using acidified dye solutions.

The resultant colored product was tested for waterfastness, lightfastness and fastness to organic solvents and the following results obtained:

*Waterfastness*

The processed stone chips were tested for waterfastness by subjection to the action of boiling water for approximately 24 hours. This treatment failed to remove any appreciable amount of color as evidenced by the fact that the water remained uncolored.

*Lightfastness*

Good lightfastness is mandatory for outdoor applications such as roofing granules and indoor applications such as terrazzo manufacture in instances where the colored product must last over many years. A general rule of thumb employed by the coloring industry is that fading due to light indoors (protected) is approximately ⅛ that of outdoors (unprotected).

The lightfastness of the colored product was tested employing a sun lamp manufactured by the General Electric Company (Model S–4) which produced ultraviolet radiation and visible energy in the following pattern:

| | Watts |
|---|---|
| Far ultraviolet (2500–2800 A.) | 0.08 |
| Middle ultraviolet (2800–3200 A.) | 2.6 |
| Near ultraviolet (3200–3800 A.) | 3.6 |
| Visible ultraviolet (3800–7600 A.) | 12.0 |

All the exposures were made at a distance of eight inches from the center of the light source. By way of comparison, it has been determined experimentally that this arrangement will fade dyestuffs at a rate at least 4 to 5 times as fast as a standard, commercial Fade-O-Meter. The above-colored chips were stable for 1500 hours and longer, thereby indicating a minimum light stability lifetime of several years in outdoor applications and approximately 18 times this long in indoor applications.

*Fastness to Solvents*

In the practice of making terrazzo, the final step includes the application of a sealer wax which is solvent based. Also, some cleaning compounds often contain a variety of solvents, and for this reason it is important that the imparted color be resistant to the effects of such solvents. It has been found that exposure of the processed chips to a group of solvents include alcohols, hydrocarbons, and chlorinated hydrocarbons for a period of 24 hours resulted is substantially none of the coloring agent being solvated.

Artificially colored chips as above prepared and treated were used in the manufacture of terrazzo following conventional practice for naturally colored stone. They were found to be very satisfactory and especially from the standpoint of mechanical strength and retention of color. The color gradation was noticeable, with the interior of the chips being slightly lighter in color, but the appearance was pleasing and the resultant terrazzo was satisfactory from the aesthetic standpoint.

When used for making marble chip roofs following conventional practice the artificially colored stone chips prepared as above likewise were found to be as satisfactory as the naturally occurring colored stone.

EXAMPLE II

The process of Example I was modified by placing the stone chips to be colored in a vat and sprinkling the solution of dyestuff onto the top surface. The solution was withdrawn from the bottom of the vat and recirculated. Circulation of the solution through the body of chips in this manner resulted in several advantages such as an ability to use a much smaller amount of dye solution for a given quantity of stone. Also, it was possible to heat the recirculating solution of dye to the desired temperature rather than the entire vat of stone and dye solution and thereby effect a further processing advantage.

EXAMPLE III

The process of Example I was repeated with the exception that the stone was treated under ambient temperature conditions. The dye solution penetrated substantially slower, but at the end of 24 hours an entirely satisfactory depth of color was obtained which was equivalent to about thirty minutes of submersion in a heated solution at a temperature of approximately the boiling point of the dye solution. Thus, the more economical ambient temperature conditions may be practiced if desired in instances where the period of treatment is not of importance.

EXAMPLE IV

The process of Example I was repeated with the exception that the dye solution was not acidified, and was made neutral to alkaline. In this modification of the process, it was found that satisfactory levels of intensity of color were obtained, although in general the depth of color was less than that yielded from the acidified solution of Example I. Therefore, either neutral or alkaline dye solutions may be used although they are not preferred.

EXAMPLE V

Examples I–IV were repeated for a second phthalocyanine dyestuff known as "Durazol Paper Blue 10GS" which is further classified by the "Colour Index" as Direct Blue 87, 74200. The color imparted to the chips by this dyestuff is a somewhat brighter, lighter blue than obtained in Examples I–IV for Alcian Blue 8GX 300 under otherwise identical conditions. Otherwise, the results were substantially the same as noted in Examples I–IV.

EXAMPLE VI

The processes of Example V were repeated for an additional phthalocyanine dyestuff known as Alcian Blue 5GX. The results of these processes were substantially the same as noted in Examples I–IV for Alcian Blue 8GX 300 under otherwise identical conditions of treatment, with the exception that the blue was less greenish.

EXAMPLE VII

The processes of Example V were repeated for still another phthalocyanine dyestuff known as "Durazol Blue 8GS" which is further classified by the "Colour Index" as Direct Blue 86, 74180. The color obtained by these processes was similar to that obtained from the processes of Example V for Alcian Blue 8GX 300 under otherwise identical conditions and the properties of the resultant chips were also substantially identical.

EXAMPLE VIII

Phthalocyanine pigments which are insoluble in water may be utilized to effect coloration of stone or other matrix in a modification of the process.

Heliogen Green Toner 66–3001 was added to a small amount of surface-active agent such as Ahcowet-ANS, an anionic surface-active agent (alkylaryl sulfonate detergent and penetrant), to make a paste, this paste was subsequently diluted with water and a dispersion of the pigment in the water was effected (50 g./gal.). Upon heating the dispersion and addition of the stone chips, a time exposure of 30 minutes or more resulted in a deep and evenly colored product.

Similar results were obtained upon substituting Heliogen Viridine Toner 66-6001 and Heliogen Blue Toner RR 56-4001.

EXAMPLE IX

The procedure of Example VIII was repeated with the exception of using kerosene as the liquid media rather than water and without a surface-active agent.

The chips were colored but the intensity of the color and depth of penetration was somewhat less than that obtained in Example VIII. However, the surface coloration was satisfactory. If desired, a surface-active agent which is soluble in kerosene may be added to improve the penetration and intensity of coloration.

EXAMPLE X

This example illustrates the use of oil soluble phthalocyanine dyestuffs in the coloring of porous inorganic material.

An oil-soluble phthalocyanine dyestuff such as disclosed in U.S. Patent 2,761,868, is dissolved in kerosene in an amount of 50 grams per gallon. The resultant solution is heated to a temperature near the boiling point of kerosene, and marble chips of a size used in the manufacture of terrazzo immersed in the hot solution for a period of 1½ hours. The resultant uniformly colored chips after draining off the dye solution and removal of solvent are ready for use as roofing granules or in the manufacture of terrazzo.

What is claimed is:

1. A process for artificially coloring in its interior a body of a colorable naturally occurring material selected from the group consisting of whitestone, calcitic limestone, dolomitic limestone, dolomite, marble, granite, and aquatic animal shells which consists essentially of the step of
    intimately contacting solid matter consisting essentially of said material with a liquid medium containing a phthalocyanine colorant therein,
    an excess of the said liquid medium containing the phthalocyanine colorant over the quantity required to wet the surface area being intimately contacted with the body of material over at least fifteen minutes and for a period of time sufficient for the colorant to color the body internally and thereby produce an internally artificially colored body of the material, the liquid medium containing the phthalocyanine colorant being mobile and capable of freely flowing during the entire period of time required for the phthalocyanine colorant to internally artificially color the body of material,
    the material being in the form of a hard, coherent body of at least one-eighth inch in thickness in at least one dimension and containing natural water at the time of contacting with the liquid medium and being untreated by a process for the removal of natural water tenaciously held therein whereby the material is rendered useful as a colored building material,
    the liquid medium containing the phthalocyanine colorant being selected from the group consisting of
        (a) a liquid medium containing suspended finely divided solid phthalocyanine pigment, the pigment being insoluble in the liquid medium,
        (b) a dilute acidic aqueous solution of phthalocyanine colorant soluble therein, and
        (c) a solution in at least one organic solvent selected from the group consisting of normally liquid hydrocarbons, normally liquid halogenated hydrocarbons, and nitrobenzene of phthalocyanine colorant soluble therein,
    when the material is artificially internally colored by intimately contacting it at ambient temperature with a liquid medium containing suspended phthalocyanine pigment, the material being intimately contacted with the liquid medium containing suspended phthalocyanine pigment over a period not less than about 24 hours with the phthalocyanine pigment being maintained suspended therein and the liquid medium being mobile and freely flowable throughout at least the 24 hour contact period, and
    when the said material is artificially internally colored by intimately contacting it with a dilute acidic aqueous solution of phthalocyanine colorant soluble therein, the said material being contacted with the dilute acidic aqueous solution of phthalocyanine colorant in the absence of a substantial amount of a solid finely divided alkaline substance other than the said material which causes the phthalocyanine colorant to precipitate from the acidic aqueous solution.

2. The artificially colored material produced by the process of claim 1.

3. A stone chip roof containing the artificially colored material of claim 2 in particulate form.

4. Terrazzo containing the artificially colored material of claim 2 in particulate form.

5. The process of claim 1 wherein the material is dolomitic limestone.

6. The process of claim 1 wherein the material is in the form of particles having a size of about one-eighth inch to one inch.

7. The process of claim 1 wherein the liquid medium contacted with the material is warmed to a temperature of at least 50° C. and not exceeding the boiling point of the liquid medium.

8. The process of claim 1 wherein the liquid medium contacted with the material is a solution in at least one organic solvent selected from the group consisting of normally liquid hydrocarbons, normally liquid halogenated hydrocarbons and nitrobenzene of a phthalocyanine colorant soluble therein.

9. The process of claim 8 wherein the solution contacted with the material is an oil soluble phthalocyanine dyestuff dissolved in kerosene.

10. The process of claim 1 wherein the material is contacted with a liquid medium containing suspended finely divided solid phthalocyanine pigment, the pigment being insoluble in the liquid medium.

11. The process of claim 10 wherein the material is dolomitic limestone in the form of particles having a size of about one-eighth inch to one inch, the liquid medium contains a surface active agent, and the liquid medium has a temperature of at least 50° C. and not exceeding the boiling point.

12. The process of claim 1 wherein the liquid medium contacted with the material is a dilute aqueous solution of phthalocyanine colorant soluble therein.

13. The process of claim 12 wherein the material is dolomitic limestone.

14. The process of claim 12 wherein the material is in the form of particles having a size of about one-eighth inch to one inch.

15. The process of claim 12 wherein the liquid medium is warmed to a temperature of at least 50° C. and not exceeding the boiling point.

16. The process of claim 1 wherein the liquid medium contains a surface-active agent.

17. The process of claim 12 wherein the material is dolomitic limestone in the form of particles having a size of about one-eighth inch to one inch, and the liquid medium is warmed to a temperature of at least 50° C. and not exceeding the boiling point.

References Cited in the file of this patent
UNITED STATES PATENTS 1,293,832    McDonough _____ Feb. 11, 1919

OTHER REFERENCES

Soxhlet: Art of Dyeing and Staining Marble, Artificial Stone, Bone, Wood, etc., 1902, pub. by Scott Greenwood & Co., pages 83-90.

Dahlen: Ind. Eng. Chem., 1939, pages 839-847.